United States Patent [19]

Hüsgen

[11] Patent Number: 5,282,126
[45] Date of Patent: Jan. 25, 1994

[54] START CIRCUIT FOR A SWITCHED MODE POWER SUPPLY

[75] Inventor: Theo Hüsgen, Aachen, Fed. Rep. of Germany

[73] Assignee: U.S. Philips Corporation, New York, N.Y.

[21] Appl. No.: 924,277

[22] Filed: Aug. 3, 1992

[30] Foreign Application Priority Data

Aug. 1, 1991 [DE] Fed. Rep. of Germany ....... 4125510

[51] Int. Cl.⁵ .......................................... H02M 7/517
[52] U.S. Cl. ...................................... 363/49; 323/222; 323/901
[58] Field of Search ....................... 323/901, 222, 282; 363/20, 21, 49, 97, 131

[56] References Cited

U.S. PATENT DOCUMENTS

| | | | |
|---|---|---|---|
| 4,695,936 | 9/1987 | Whittle | 363/21 |
| 4,801,887 | 1/1989 | Wegener | 328/26 |
| 4,864,485 | 9/1989 | Rilly et al. | 363/97 |
| 4,887,199 | 12/1989 | Whittle | 363/49 |
| 4,910,654 | 3/1990 | Forge | 363/49 |
| 5,200,886 | 4/1993 | Schwarz et al. | 363/131 |

FOREIGN PATENT DOCUMENTS 2638225 3/1978 Fed. Rep. of Germany ......... H02M 3/24

*Primary Examiner*—J. L. Sterrett
*Attorney, Agent, or Firm*—Bernard Franzblau

[57] ABSTRACT

A circuit arrangement, which includes a switched-mode power supply energized by a source and which is controlled by a control circuit. The switched-mode power supply supplies the control circuit with energy during operation. The circuit also comprising a starter circuit for applying a supply current to the control circuit when the arrangement is put into operation. A particularly simple and inexpensive construction is obtained in that the starter circuit comprises a capacitive voltage divider which is fed directly by the source and is provided with a tapping wherefrom the supply current is derived via a rectifier element.

7 Claims, 1 Drawing Sheet

START CIRCUIT FOR A SWITCHED MODE POWER SUPPLY

BACKGROUND OF THE INVENTION

This invention relates to a circuit arrangement comprising a switched-mode power supply (SMPS), a source for feeding the SMPS and a control circuit for controlling the SMPS, wherein the SMPS supplies the control circuit with energy during operation, and also comprising a starter circuit for applying a supply current to the control circuit when the arrangement is put into operation.

A circuit arrangement for generating a DC voltage from a sinusoidal input voltage is known from DE-PS 36 12 147, which corresponds to U.S. Pat. No. 4,801,887 (Jan. 31, 1989). This input voltage is used to apply energy to a switched-mode power supply and a control circuit activating the power supply. The voltage required for the control circuit is derived by a circuit arrangement during operation, a capacitor in said circuit arrangement being coupled to a first output terminal of the source and being dischargeable via a first diode arrangement and the switched-mode power supply, said circuit arrangement including a series connection which consists of a second diode arrangement which is connected parallel to the first diode arrangement and via which only the charging current of the capacitor flows, and of at least one parallel connection of the control circuit and a smoothing capacitor, which parallel connection is connected to a terminal of the switched-mode power supply.

Customarily, the switched-mode power supply is switched on by the control circuit when the voltage across the control circuit reaches a threshold value. When the complete circuit arrangement is put into operation, therefore, initially the discharging current of the capacitor cannot flow across the switched-mode power supply. Therefore, the prior art circuit arrangement comprises a starter circuit via which at least the discharging current of the capacitor flows until the threshold value is reached. When the switched-mode power supply has been switched on, the discharging current can flow thereacross.

In the circuit arrangement known from DE-PS 36 12 147, i.e. U.S. Pat. No. 4,801,887 the starter circuit comprises a transistor whose collector is connected to the first connection terminal of the source and whose emitter is coupled to the junction of the second diode arrangement and the parallel connection of the control circuit and the smoothing capacitor. The discharging current of the capacitor flows via the collector-emitter path of the transistor and a preceding collector resistance. The transistor as well as the collector resistance, therefore, are to be proportioned for the current whereby the smoothing capacitor connected parallel to the control circuit is to be charged and whereby the control circuit is to be powered upon activation. Moreover, during operation these elements are exposed to at least approximately the source voltage. Especially when the switched-mode power supply is powered from a power supply mains, the transistor and the collector resistance must be proportioned for a high voltage and comparatively large currents. For circuit components which are required to operate for only very brief periods of time in comparison with the overall period of operation of the circuit arrangement, this is uneconomical, especially when they are used in small and inexpensive domestic appliances.

SUMMARY OF THE INVENTION

It is an object of the invention to provide a starter circuit that can be simply and inexpensively manufactured.

This object is achieved in accordance with the invention in that the starter circuit comprises a capacitive voltage divider which is connected directly to the source and which comprises a tapping wherefrom the supply current can be derived via a rectifier element.

The circuit arrangement in accordance with the invention does not require the use of a transistor and collector resistance rated for high voltages and large currents. The capacitive voltage divider used instead has a low-loss operation and, moreover, can also operate as a smoothing element or anti-interference element connected to the source during operation of the circuit arrangement. As a result of this double function, the components are economically used. The supply current derived from the tapping, moreover, is available at a comparatively low voltage so that the rectifier element to be used need not satisfy severe requirements as regards its breakdown voltage. The starter circuit in accordance with the invention thus has a simple and inexpensive construction.

BRIEF DESCRIPTION OF THE DRAWING

Further attractive embodiments of the invention are disclosed in the dependent Claims and described in detail with reference to the accompanying drawing, in which:

DESCRIPTION OF THE PREFERRED EMBODIMENTS

Figure 1:
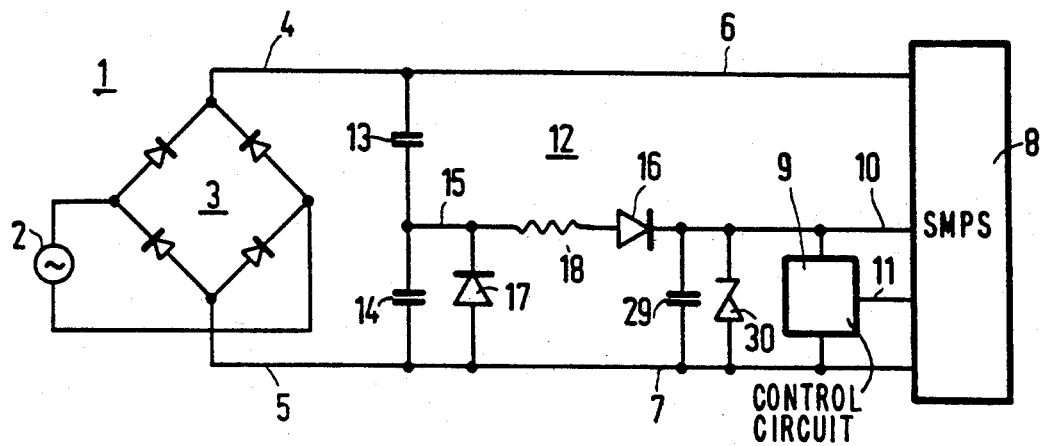
FIG. 1 shows a first example of the use of the starter circuit in accordance with the invention in a switched-mode power supply comprising a charging capacitor.

The first embodiment shown in FIG. 1 comprises a source 1 which consists of an alternating voltage source 2 which represents, for example, an alternating voltage mains, and a bridge rectifier 3. The source 1 outputs a pulsating DC voltage via two terminals 4, 5, energy thus being applied to a switched-mode power supply 8 via leads 6, 7. The switched-mode power supply 8 and a load powered thereby may be of a different, known construction.

The circuit arrangement shown in FIG. 1 also comprises a control circuit 9 which receives energy from the switched-mode power supply 8 via a lead 10 during operation. The switched-mode power supply is controlled in known manner by the control circuit 9 via a control lead 11.

When the circuit arrangement is switched on, i.e. when the source 1 is switched on, the switched mode power supply 8 initially does not yet apply energy to the control circuit 9 via the lead 10, so that if no special steps are taken the control circuit 9 cannot start to operate either, hence the switched-mode power supply 8 also cannot become operative. Therefore, when the circuit arrangement is switched on, the control circuit 9 receives energy for an intermediate period of time via a starter circuit 12, which energy ensures operation of the control circuit 9 until the supply of energy via the switched-mode power supply 8 and the lead 10 is effective. To this end, the starter circuit 12 comprises a capacitive voltage divider which consists of two capacitors 13, 14 whose capacitances are chosen in conformity with the ratio of the voltage supplied by the source 1 to the supply voltage required by the control circuit 9. The junction of the capacitors 13, 14 is constructed as a tapping 15 wherefrom a supply current can be derived for the control circuit 9, via a rectifier element 16. When the source 1 is switched on, the capacitors 13, 14 are charged. The energy then flowing into the capacitor 14 is available, via the rectifier element 16, for the activation of the control circuit 9, for example, for starting an oscillator included therein. Via the control lead 11 the control circuit 9 is thus also capable of controlling the switched-mode power supply 8 so that, even without previous operation thereof, it starts to supply energy via the lead 10. The energy flowing via the lead 10 then ensures further operation of the control circuit 9. A smoothing capacitor 29 and a zener diode 30 are connected parallel to one another between the leads 7 and 10 for the smoothing and limiting, respectively, of the supply voltage applied to the control circuit 9.

In the circuit arrangement shown in FIG. 1, a second rectifier element 17 is arranged between a terminal 5 of the source 1 and the tapping 15 with an opposite polarity relative to that of the source. This rectifier element serves mainly to avoid negative charges across the capacitor 14 when the source 1 is switched off.

In order to limit switch-on current surges, the supply current is applied via a limiting impedance 18 from the tapping 15 of the starter circuit. In the simplest case, an ohmic resistor is used for this purpose, the losses occurring therein being acceptable because they occur only briefly when the circuit arrangement is switched on.

In the circuit arrangement shown in FIG. 1 the capacitive voltage divider consisting of the capacitors 13, 14 also serves as a charging capacitor for the DC power supply of the switched-mode power supply 8 by the source 1. This dual use of the components reduces the cost of construction of the circuit arrangement.

Figure 2:
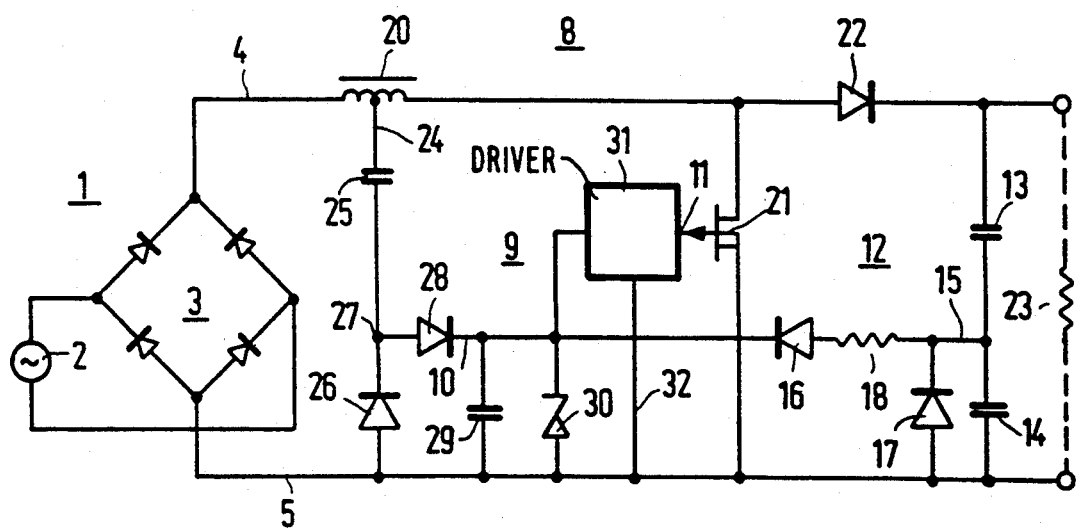
FIG. 2 shows the invention in a switched-mode power supply constructed as a boost regulator.

FIG. 2 shows a further embodiment of the invention, in which the switched-mode power supply 8 is constructed as a boost regulator, comprising a series connection of an inductance 20 and a switching element 21 wherefrom a voltage for feeding a load can be derived via a third rectifier element 22, said load being diagrammatically shown in FIG. 2 as an ohmic resistance 23. The capacitive voltage divider 13, 14 of the starter circuit 12 is connected parallel to the load 23. The circuit elements similar to those shown in FIG. 1 are denoted by identical references.

The switched-mode power supply 8 in the form of a boost regulator as shown in FIG. 2, moreover, comprises a supply circuit for applying energy to the control circuit 9 during operation as has been described essentially in German Patent Specification 36 12 147. The inductance 20 of the switched-mode power supply 8, being connected to the first terminal 4 of the source 1, comprises for this purpose a tapping 24 which is connected, via a capacitor 25 and a diode 26 which is connected in the reverse direction relative to the source 1, to the second terminal 5 of the source 1. Between the junction 27 of the capacitor 25 and the diode 26 and the lead 10 a second diode 28 is connected in the forward direction, the control circuit 9 being supplied with energy from the capacitor 25 during operation via said lead 10. The stabilization elements for the supply voltage for the control circuit 9 (only diagrammatically shown in FIG. 1), i.e. a smoothing capacitor 29 and a zener diode 30, are connected in parallel between the lead 10 and the second terminal 5 of the source 1. The control circuit 9 also includes the driver circuit 31 which supplies a switching signal for the switching element 21 on the control lead 11 and which receives energy via the lead 10 and a connection 32 to the second terminal 5 of the source 1. In order to supply the driver circuit 31 with energy when the circuit arrangement is switched on, the starter circuit is also connected to the lead 10 via the rectifier element 16.

When the circuit arrangement is switched on, i.e. when the source 1 is switched on, a current flows through the inductance 20, the third rectifier element 22 and the capacitive voltage divider 13, 14 while initially the driver circuit 31 is not yet in operation and hence the switching element 21 is still blocked. As a result, the capacitor 14 is charged to an initial voltage which is adequate on the one hand to charge, via the rectifier element 16, the smoothing capacitor 29 and on the other hand to activate the driver circuit 31. Once the driver circuit 31 has been activated, via the switching element 21 and the inductance 20 of the switched-mode power supply 8 energy is applied also to the capacitor 25 and hence, via the diodes 26, 28 and the smoothing capacitor 29, ultimately also to the driver circuit 31 for further operation of the SMPS.

In the embodiment of FIG. 2 the capacitor voltage divider 13, 14 also serves for smoothing the voltage applied to the load 23 so that economical use of these circuit elements is also possible in this circuit arrangement.

I claim:

1. A circuit arrangement, comprising: a switched-mode power supply (SMPS) a source for feeding the SMPS and a control circuit for controlling the SMPS, which SMPS supplies the control circuit with energy during operation, and a starter circuit for applying a supply current to the control circuit when the circuit arrangement is put into operation, characterized in that the starter circuit comprises a capacitive voltage divider which is connected directly to the source and which comprises a tapping wherefrom the supply current is derived via a rectifier element.

2. A circuit arrangement as claimed in claim 1, further comprising second rectifier element of a polarity opposing that of the source and connected between a terminal of the source and the tapping.

3. A circuit arrangement as claimed in claim 1 wherein the connection from the starter circuit to the control circuit comprises a limiting impedance.

4. A circuit arrangement as claimed in claim 2, wherein the SMPS comprises a boost regulator, including a series connection of an inductance and a switching element wherefrom, via a third rectifier element, a voltage is derived for feeding a load, the capacitive voltage divider being connected parallel to the load.

5. A circuit arrangement as claimed in claim 2, wherein the connection from the starter circuit to the control circuit comprises a limiting impedance.

6. A circuit arrangement as claimed in claim 1, wherein the SMPS comprises a boost regulator including a series connection of an inductance and a switching element wherefrom, via a second rectifier element, a voltage is derived for feeding a load, the capacitive voltage divider being connected parallel to the load.

7. A circuit arrangement as claimed in claim 5, wherein the SMPS comprises a boost regulator including a series connection of an inductance and a switching element wherefrom, via a third rectifier element, a voltage is derived for feeding a load, the capacitive voltage divider being connected parallel to the load.

* * * * *